Patented Jan. 25, 1949

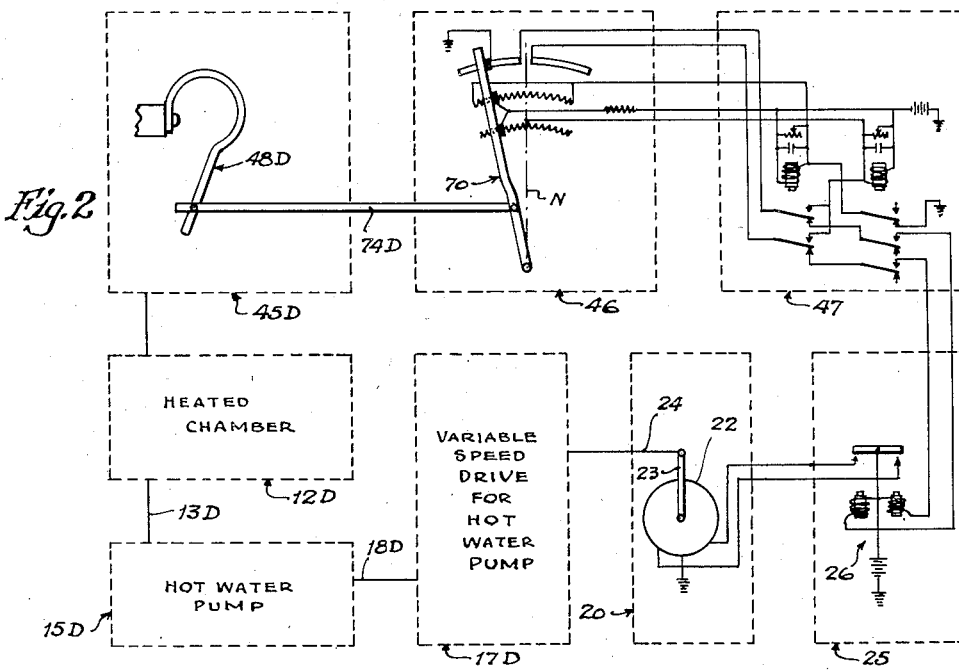
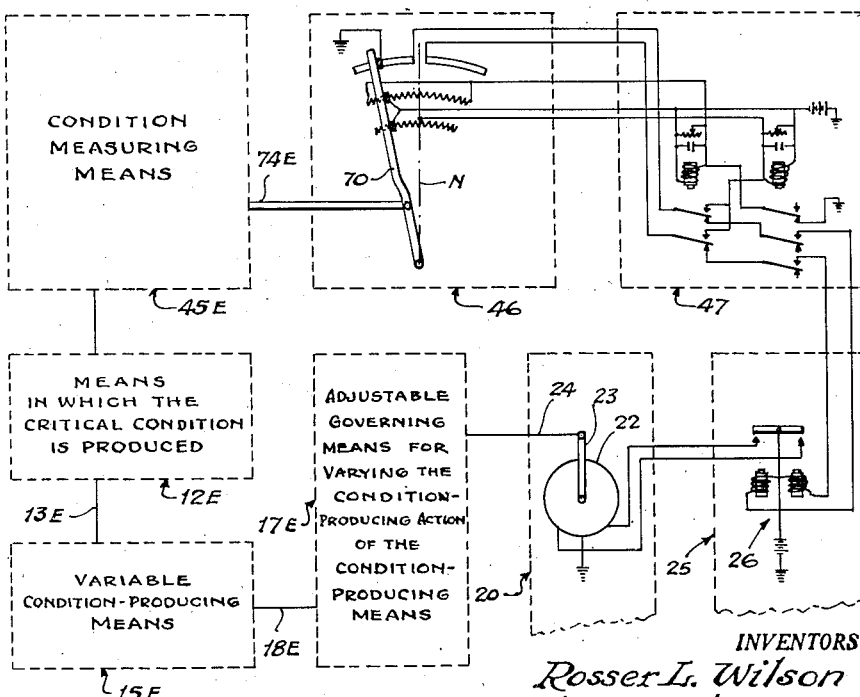

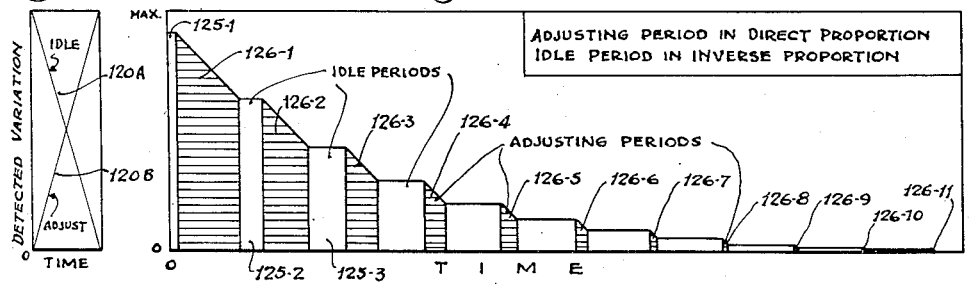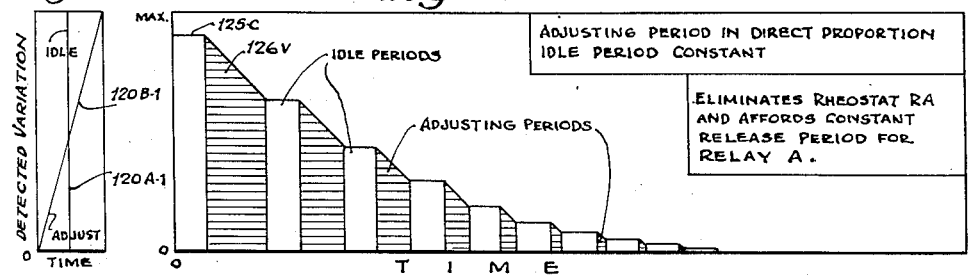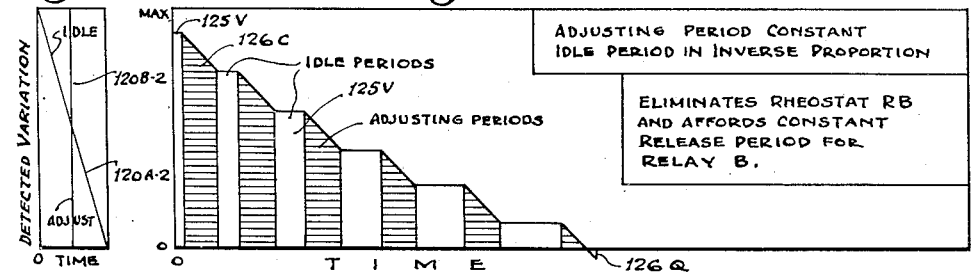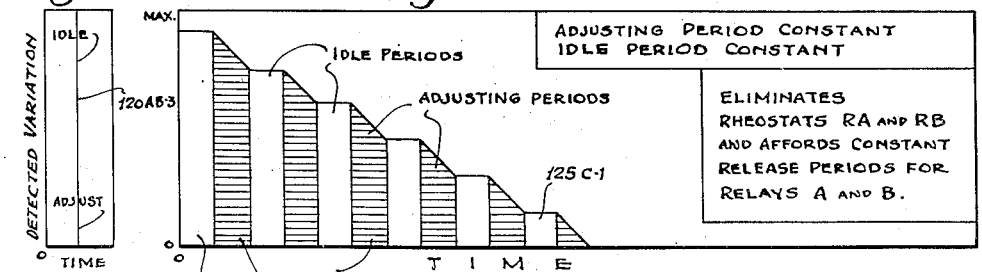

2,460,055

UNITED STATES PATENT OFFICE 2,460,055

CONTROL APPARATUS

Rosser L. Wilson, Mahwah, and Erwin R. Knauer, Westwood, N. J., assignors to American Brake Shoe Company, New York, N. Y., a corporation of Delaware Application October 24, 1945, Serial No. 624,184

21 Claims. (Cl. 175—320)

This invention relates to control apparatus and particularly to control apparatus for governing and regulating a selected variable condition so as to maintain such condition at a substantially constant measurable value.

It is well recognized that problems of automatic regulation may be encountered in almost any field where a variable condition that is of a measurable character is considered to be important or critical, and such variable conditions may relate to such measurable factors as heat, time, relationship, quantity, dimensions, motion or physical properties of matter or compositions of matter, as well as to other variable factors or conditions. In most instances the problem of regulation involves the maintenance of the critical condition at a predetermined measurable value, or within a selected range or tolerance on either side of such a predetermined value, and this of course involves not only the measurement of the critical condition but also the performance of corrective control operations to re-establish the desired condition when objectionable variation thereof is detected by the condition measuring means.

The performance of such corrective adjusting or controlling operations must of course take place rapidly and promptly upon detection of an objectionable variation in the measured value of the critical condition, for in the absence of such prompt and rapid correction, the regulating apparatus is sluggish and lacks the desirable characteristics of responsiveness and accuracy of regulation. The attainment of rapidity and promptness of operation in such regulators tends, however, to cause over-correction or hunting, and because of this it has been necessary in the past to resort to quite complicated and expensive structure in prior regulators in order to attain responsiveness without hunting. Moreover in such highly responsive regulators as heretofore constructed the range of accurate performance has been quite limited, and the response characteristics of such prior regulators have been such that almost every different condition, or field of use, or range of conditions, has required the design and construction of a highly specialized control apparatus. As a result, most regulators have been relatively expensive to manufacture and maintain, and in view of this, it is an important object of the present invention to simplify the construction and maintenance of highly sensitive and accurate regulators, to enable regulators to be utilized in many different fields, to simplify and facilitate the application of a basic form and construction of a regulator to different fields and conditions of use, and to enable these objectives to be attained in a practical and economical manner.

It will be evident that when the critical condition of speed, temperature, humidity or the like has varied in a considerable amount from the desired predetermined value, the readjusting or correcting operations may progress quite rapidly and may be relatively long, but it will also be evident that when the amount of variance of the critical condition from the desired value is relatively small, the increments of correction or readjustment must be relatively small in order to avoid over-adjustment with the constant tendency of the apparatus to hunt. It is therefore a further object of the present invention to enable the correction or readjustment of a critical condition to be accomplished without hunting, and a further object is to enable this to be accomplished by apparatus that is simple and inexpensive in character. Another and related object is to materially simplify the attainment of a proportionalized governing or regulating operation, and to enable such proportionalized governing action to be attained by means that is primarily electrical in character.

A further object of the invention is to accomplish a proportionalized governing or regulating operation through use of a plurality of slow-to-release relays, and to enable the release times of such relays to govern not only the length of the speed adjusting operations that are effected but also to enable such relays to govern the intervals between the successive speed adjusting operations of the apparatus. A more specific object of the invention is to utilize slow-to-release relays in such a manner that the release times of such relays may be varied in accordance with and generally as a function of the amount of correction that is required to re-establish the desired value of the condition that is being regulated. A further object is to enable one slow-to-release relay to govern the length of the successive control operations in such a manner as to be proportional to the amount of correction that is required in the speed of the controlled motor or engine, and to enable another slow-to-release relay to govern the interval between the successive control operations in such a manner that the length of such intervals is varied in an inverse relationship to the amount of correction that is required.

In the attainment of control of the speed of a variable speed motor or engine, it is a common practice to employ an adjustable ball governor to establish the desired or predetermined speed that is to be maintained, and to associate the control apparatus with such a governor so as to attain the desired controlling action upon the speed of the motor, and it is a further action of this invention to enable an electrical control apparatus to be associated with such a ball governor in such a manner as to produce a proportionalized speed-governing action upon the motor or engine.

Other and further objects of the present invention will be apparent from the following description and claims and are illustrated in the accompanying drawings which, by way of illustration, show preferred embodiments and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claims.

In the drawings:

Fig. 2 is a diagrammatic view illustrating a temperature regulating apparatus embodying the invention;

Fig. 3 is a similar diagrammatic view illustrating the general application of the present invention to regulating problems; and Figs. 4 and 4A, 5 and 5A, 6 and 6A and 7 and 7A are views illustrating graphically the different modes of regulating operation that may readily be attained with the apparatus of the present invention.

Figure 1:
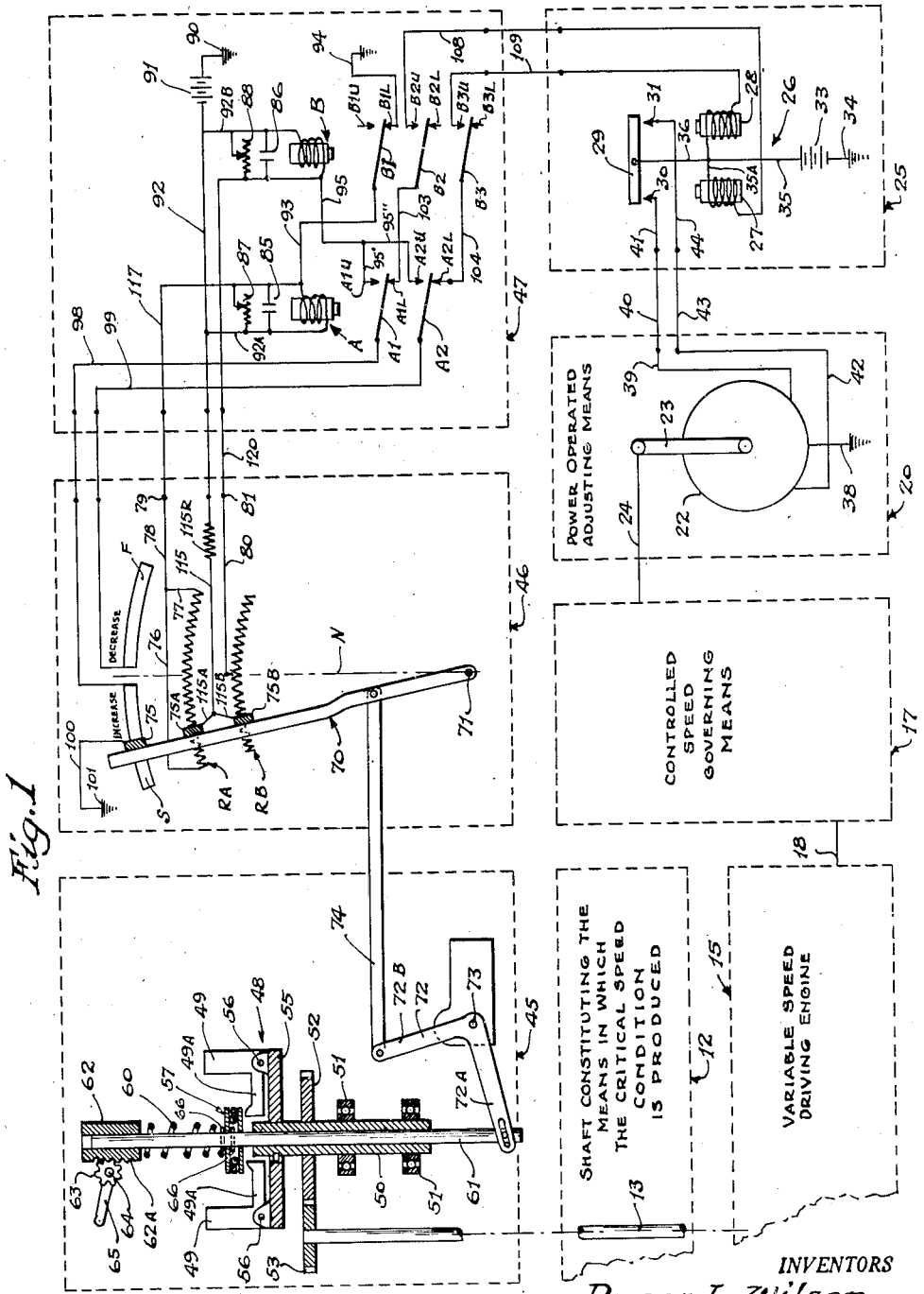
Fig. 1 is a diagrammatic view illustrating a speed regulating apparatus embodying the features of the invention.

In the form chosen for disclosure in Fig. 1 of the drawings, the invention is illustrated as embodied in a speed regulator, and in this embodiment of the invention the critical condition of speed that is to be regulated is exhibited in a means 12 that includes a rotating shaft 13. The means 12, and the shaft 13 thereof, are driven by a variable speed driving engine 15 so that the speed of the shaft 13 is dependent upon the speed at which the variable speed engine 15 is operating. Thus the means 12 constitute the means in which the critical condition is exhibited or produced, while the engine 15 constitutes the means for producing such condition. The speed of operation of the engine 15 may be adjusted by speed governing means 17 that may take different conventional forms in accordance with the type of engine 15 and the use for which the engine 15 and the means 12 are to be employed. Thus, for example, if the engine 15 takes the form of an internal combustion engine, the speed governing means 17 may constitute a device for varying the fuel supply to the engine, and may be operatively associated with the engine 15 by a connection 18, or in the event that the engine 15 is being utilized to afford driving power for a propeller, the pitch of the propeller may be varied by the speed governing means 17 so as to vary the load on the engine 15 and thereby vary the operating speed of the engine.

Operation of the speed adjusting means 17 is effected by reversible power operated adjusting means 20 that may also take many different forms in accordance with the character of the power that is available, but as shown in Fig. 1, such power operated adjusting means 20 constitute a reversible electric motor 22 having an actuating arm 23 operatively connected to the speed governing means 17 by an operating link 24. The speed adjusting means 20 are governed by power control means 25 that in the present instance includes a balanced relay 26 having operating coils 27 and 28 that are adapted when selectively energized to rock the balanced armature 29 thereof in one direction or the other from its normal position shown in Fig. 1. The balanced armature 29 is adapted for selective engagement with stationary contacts 30 and 31, and, depending upon which one of these two contacts is engaged, the adjusting motor 22 is operated in one direction or the other. Thus, as herein shown, operating power is provided for the motor 22 by a battery 33, one side of which is grounded at 34. The other side of the battery is connected by wires 35 and 36 in series to the armature 29, while connections are extended from the contacts 30 and 31 to the respective directional windings of the motor 22. As herein shown, the common terminal of the motor 22 is grounded at 38, and wires 39, 40 and 41 in series afford a connection between the other terminal of one of the directional windings to the stationary contact 30 of the relay 26. Wires 42, 43 and 44 in series form a connection between the other terminal of the other directional windings to the stationary contact 31, and hence the motor 22 will be driven in one direction or the other in accordance with the direction in which the armature 29 of the power relay 26 is actuated.

The operations of the power control relay 26 and the adjusting means 20 are controlled by the joint action of a condition measuring means 45 and control apparatus that includes switch mechanism 46 and a relay unit 47. The condition measuring means 45 must of course take a form that is dictated by the nature of the condition that is to be measured, and where this condition is represented by the rotative speed of a shaft such as the shaft 13, the condition measuring means 45 may take the form of a fly-ball governor 48 that is operatively associated with the shaft 13 so that the fly-ball governor, by the position of its centrifugal weights 49, measures and positionally represents the speed of the shaft 13.

The governor 48 may take many different forms, but, as herein shown, this governor comprises a tubular shaft 50 supported in suitable bearings 51 and having the gear 52 fixed thereon so that the shaft 50, and the gear 52, is meshed with a gear 53 fixed on the shaft 13 so that the shaft 50 of the governor 48 is rotated at a speed that is proportional to the operating speed of the shaft 13. On the shaft 50, a supporting disc or plate 55 is mounted so as to afford support for the governor weights 49, and these governor weights 49 are mounted on opposite positions on the plate 55 on pivotal axes 56. The governor weights 49 are formed as parts of bell cranks that afford inwardly projecting arms 49A, the inner ends of which are disposed beneath the lower race of an anti-friction thrust bearing 57. When the shaft 50 is rotated, the weights 49 tend to move outwardly, thereby to force the bearing 57 upwardly with respect to the shaft 50, and this action is resisted by an adjustable governor spring 60 that is disposed above the bearing 57 in surrounding relation to a governor rod 61 that is slidably disposed in the tubular shaft 50. The spring 60 rests at its lower end against the upper race of the bearing 57, while the other or upper end of the spring 60 bears against the lower end of an adjusting sleeve 62 that surrounds the upper end portion of the rod 61. Thus a vertical adjustment of the sleeve 62 serves to afford an adjustment of the spring pressure applied downwardly upon the bearing 57, and such an adjustment may be conveniently attained through an adjusting means that includes a rack 62A formed on the outer surface of the sleeve 62 and a pinion 63 formed on a stationarily supported horizontal rock shaft 64 so that the pinion engages the rack 62A. An operating lever 65 is provided on the end of the shaft 64 so that the shaft may be rotated to effect the desired adjustment of the governor spring 60.

The bearing 57 is connected to the governor rod 61 in a force transmitting relationship, as by pins 66, and with this arrangement, the vertical movements and location of the rod 61 serve as an indication of the speed or the speed variations of the shaft 13 from the desired predetermined speed. The predetermined speed that is to be maintained by the control apparatus shown in Fig. 1 is adjusted and determined by the setting or tension of the governor spring 60, and, when the shaft 13 is operating at the desired predetermined speed, the shaft or governor rod 61 will be disposed in a predetermined or normal position, and, in the event of variation of the speed in the shaft 13 either above or below the desired predetermined speed, the governor rod 61 will be shifted longitudinally in one direction or the other from the normal position that it occupies when the proper predetermined speed exists.

The movements of the governor rod 61 that are thus afforded in response to undesired variations in the speed of the shaft 13 are utilized in accordance with the present invention to impart proportionalized adjusting operations to the motor 22 and hence to the speed governing means 17, and this is accomplished through electrical means that are simple in character and reliable in operation. In the attainment of such controlling action in respect to the adjusting motor 22, the speed indicating movements or positions of the governor rod 61 are utilized to operate the switch means 46 that control a relay unit 47, and this relay unit 47 serves, in turn, through the power relay 26, to govern the operation of the motor 22 so that the corrective adjustments applied to the speed governing means 17 by the motor 22 are proportional to the amount of the detected or measured deviation of the speed of the shaft 13 from the desired or predetermined speed.

The switch unit 46 includes a shiftable control member 70 that is operatively connected with the governor rod 61 so as to afford a motion multiplying means, and in the present instance the control member 70 is in the form of an elongated lever that is pivotally mounted at 71 at its lower end. In affording an actuating connection between the governor rod 61 and the control member 70, a bell crank 72, pivoted at 73, has one arm 72A thereof connected by a pin and slot connection to the governor rod 61, while a link 74 is pivoted at its opposite ends to the other arm 72B of the bell crank and to the control member 70. Thus the vertical movements of the governor rod 61 are applied to the control member 70, and the control member 70 is utilized as a contact carrying means for shifting a plurality of contacts in opposite directions and along arcuate paths from a neutral position indicated by the dotted line N. When the shaft 13 is operating at the desired speed the control member 70 is maintained in the aforesaid neutral position, while variation of the engine speed from the desired standard moves the control member 70 in one direction or the other from such neutral position. Thus, when the engine speed falls below the desired predetermined speed, the governor rod 61 moves downwardly from its normal or neutral position, and the control member 70 is moved to the left from the aforesaid neutral position, and, in such movement, a contact 75, carried on the member 70 adjacent to its end, is moved into engagement with an arcuate contact strip S. Similarly, when the speed of the engine 15 increases above the desired predetermined speed, the governor rod 61 is moved upwardly so as to shift the upper end of the member 70 and the contact 75 in a right hand direction so as to engage the contact 75 with an arcuate contact strip F. When the shaft 13 is operating at the desired speed, the member 70 is located in its neutral position, and the brush or contact 75 is located in the space intermediate the adjacent ends of the contact strips S and F.

The control member 70 is also arranged to operate a pair of rheostats RA and RB that afford variable resistances that are associated with the relay unit in such a way as to be effective in attaining the desired proportional governing action. The rheostat RA is arcuate in form and is arranged for cooperation with a brush or contact 75A carried on the member 70 and forming part of the rheostat RA. The opposite ends of the resistance RA are connected by wires 76 and 77 that are in turn connected by a wire 78 to a terminal 79. The resistance RA is so disposed that when the contact 75A is in its neutral position, the maximum amount of resistance will be included between the contact 75A and the wire 78. The rheostat RB also includes an arcuate resistance that is adapted for cooperation with a wiper or contact 75B carried on the control member 70, and it will be observed that the resistance RB has a center tap connection with a wire 80 at what constitutes the neutral position of the contact 75B, and the wire 80 is extended to a terminal 81.

The switch means 46 are operatively associated with the relay unit 47 so as to control the operation of a pair of relays A and B that form part of the relay unit, these relays being of the slow-to-release type. The relay A has movable contacts A—1 and A—2, the movable contact A—1 being arranged to normally engage a stationary relay contact A1L, and being shiftable when the relay is operated so as to be disengaged from the relay contact A1L and to be engaged with the relay contact A1U. Similarly the movable relay contact A—2 is arranged so as to be normally engaged with a relay contact A2L, and, when the relay A is operated, the contact A—2 is disengaged from the contact A2L and is engaged with a stationary contact A2U.

The relay B has movable relay contacts B—1, B—2 and B—3, the relay contact B—1 being normally engaged with a stationary relay contact B1L, and being arranged to be moved into engagement with an idle stationary relay contact B1U when the relay B is operated. Similarly the movable relay contact B—2 is normally engaged with an idle stationary relay contact B2L, and is arranged to engage a stationary contact B2U when the relay B is operated. The movable relay contact B—3 is arranged so as normally to engage an idle stationary relay contact B3L, and, when the relay B is operated, the contact B—3 is engaged with a stationary contact B3U.

The relays A and B may have the desired slow-to-release characteristics imparted thereto in different ways, but, as herein shown, such characteristics are obtained through the use of condensers connected in parallel across the terminals of the energizing coils of such relays. Thus the relay A has a condenser 85 connected across the terminals of its energizing coil, while a condenser 86 is similarly connected in parallel across the terminals of the actuating coil of the relay B. The release periods of the relays A and B are, of course, governed primarily by the capacity of the condensers 85 and 86 respectively, and the normal effectiveness of such condensers is, in the present instance, rendered adjustable through the use of adjustable resistors 87 and 88 that are connected in parallel with the condensers 85 and 86 respectively so as to govern the discharge paths of the respective condensers.

The energizing circuit for the relay A is extended from ground at 90 through a source of electrical energy such as a battery 91 and through wires 92 and 92A in series to one terminal of the actuating coil of the relay A, and from the other terminal of the relay A, a wire 93 extends circuit to the movable contact B—1, the related stationary contact B1L being grounded as at 94. Thus it will be clear that the relay A tends to operate whenever the relay B is de-energized or in its inoperative or released position. When the relay A is thus energized and operated, and as an incident to such operation, the condenser 85 is charged. When the relay A is thus operated, the relay contacts A—1 and A—2 thereof are moved to their upper positions so as to be engaged respectively with the stationary relay contacts A1U and A2U. When this occurs, the energizing circuit for the relay B is conditioned, this circuit being provided from ground at 90 through the battery 91, the wire 92 and a branch lead 92B to one terminal of the actuating coil of the relay B. A wire 95 extended from the other terminal of the relay B terminates in branch leads 95' and 95" that extend respectively to the stationary relay contacts A1U and A2U. The movable relay contact A—1 is connected by a wire 98 to the contact segment S, while the movable relay contact A—2 is connected by a wire 99 to the contact segment F, and the brush 75 that is adapted for selective contact with these two segments is connected by a wire 100 to ground at 101. Hence the energizing circuit for the relay B is controlled jointly by the contacts of the relay A and by the position of the control member 70.

Thus when the control member 70 is in its neutral position, so as to indicate that the shaft 13 is operating at the desired speed, the brush 75 will be located in the space between the two contact segments S and F, and the closure or operation of the relay A will be ineffective to cause operation of the relay B. When, however, the speed of the shaft 13 is above or below the desired speed, the brush 75 will be in engagement with one or the other of the contact segments S or F so that, if the relay A is at this time in its operated condition, the energizing circuit to the relay B will be completed. If, for example, the brush 75 moves into contact with the segment S, an energizing circuit will be extended from ground at 101 through the wire 100 and the brush 75 to the segment S and thence through the wire 98 and the engaged relay contacts A—1 and A1U. The circuit is extended from the relay contact A1U through the wires 95' and 95 to the relay coil B, and thence through the wires 92B and 92 and battery 91 to ground at 90. This energizing circuit will, of course, serve to cause operation of the relay B, with the result that the contact B—1 will be opened and the energizing circuit to the relay A will be broken. The relay A will, however, remain in its operated position until the associated condenser 85 has been substantially discharged, and until such time as the relay A releases, the energizing circuit for the relay B will be maintained.

When the charge on the condenser 85 has been sufficiently reduced, the relay A will release, and the contacts A—1 and A—2 will return to their lower positions. This serves, of course, to break the energizing circuit to the relay B, and it serves also to close the circuits to the stationary contacts A1L and A2L which are in the direction determining circuits that serve to determine the direction in which the motor 22 is to be operated, such determination of direction being accomplished, of course, through the selective engagement of the brush 75 with the segment S or the segment F. The contact A1L is connected by a wire 103 to the movable contact B—2, while a wire 104 connects the contact A2L with the movable contact B—3, and hence when the relay B is energized, an energizing or control circuit, as determined by the one of the segments S or F that is engaged by the brush 75, will be extended to one or the other of the stationary relay contacts B2U and B3U. Such control circuits might in some instances be extended directly from the contacts B2U and B3U to the respective direction determining windings of the motor 22, but, in order to enable a relatively high wattage or power to be employed for the motor 22, a power relay such as the relay 26 is preferably utilized for controlling the motor circuit, and the power relay 26 is governed by the brush 75 and the segments S and F in cooperation with the contacts of the two relays A and B. Thus, as shown in the present instance, when circuit is extended from the segment S, and through the various wires and relay contacts to the relay contact B2U, this circuit is extended by a wire 108 through the coil 27 of the relay 26 and through a wire 35A, the wire 35, and through the battery 33 to ground 34. Similarly, a circuit extended from ground at 101 through the contact segment F, extends of course to the relay contact B3U, and this circuit is extended by a wire 109 through the coil 28 of the relay 26 and through the battery 33 and to ground at 34. When the relay coil 27 is energized, the armature 29 is rocked in a counterclockwise direction so as to engage a contact 30, the armature being connected to the battery 33 by wires 35 and 36. This establishes circuit from ground at 34 through the battery 33 and wires 35 and 36, the armature 29 and the contact 30, and this circuit is extended by wires 41, 40 and 39 to one terminal of the motor 22, the common terminal of the motor being connected to ground at 38. This circuit, which is closed by reason of the undesirably low speed of the shaft 13, causes the motor 22 to operate in such a direction that the speed of the engine 15 is increased.

When the relay coil 28 of the power relay is energized, the armature 29 is engaged with the relay contact 31, and this contact is connected by the wires 44, 43 and 42 to the other direction determining terminal of the motor 22. This circuit causes the speed of the engine 15 to be decreased. Thus a selective energizing circuit for the motor 22 is afforded when the power relay 26 is operated in one sense or the other, and this circuit is continued until such time as the brush 75 is moved into the space between the segments S or F or until such time as the relay B is released.

As hereinbefore pointed out the rheostats RA and RB are related to the elements of the relay unit 47 in such a manner as to produce the desired proportionalized governing action, and in attaining this result provision is made whereby variable portions of the resistance RA may be connected across the condenser 85, while variable portions of the resistance RB may be connected across the condenser 86. Thus the two brushes 75A and 75B are connected by a wire 115 and branches 115A and 115B to the end of a wire 115, and the wire 115 is connected through a resistance 115R to the wire 92 so that circuit is extended from the two brushes 75A and 75B through the wires 115 and 92 and the branches 92A and 92B respectively to one side of each of the condensers 85 and 86. The resistance 115R is employed in the present instance merely to insure that there will at all times be some resistance or load across the power source. Circuit from the other side of the condenser 85 is extended by a wire 117 to the terminal 79 so as to be connected to the opposite ends of the resistance RA, while a wire 120 is connected to the terminal 81 so as to be connected to the center of the resistance RB. With this construction, variable portions of the resistance RA may be rendered effective to afford a variable resistance leakage path for the condenser 85, while variable portions of the resistance RB may be rendered effective to afford a variable resistance leakage path for the condenser 86, and although the effective portion of the resistance RA might be placed in series with the resistance 87, and the effective portion of the resistance RB might be so arranged as to be in series with the resistance 88, the arrangement as herein shown places the resistance 87 in parallel with the resistance RA, and the resistance 88 in parallel with the resistance RB.

With the structure thus described, the portion of the resistance RA that is effective across the condenser 85 is at the maximum so that the release time of the relay A is at its maximum, when the detected speed variation is relatively small, and the effective portion of the resistance RA becomes gradually smaller and the release time of the relay A becomes shorter as the detected variation becomes greater. The release time of the relay A serves to govern the length of the idle period between control impulses or operations of the motor 22, and hence it will be clear that the variations in the effective resistance RA cause such idle intervals to vary in an inverse relationship to the detected variation that is to be corrected. The other variable resistance RB is however connected in a different manner, and the portion of the resistance RB that is effective across the related condenser 86 is at the minimum when the detected speed variation is relatively small, and becomes gradually greater as the detected speed variation becomes greater. The effect of such variation in the effective portions of the resistance RB is to increase the release time of the relay B as the detected speed variation becomes greater, and since the release time of the relay B governs the length of the control impulses, such variations in the resistance across the relay B serve to vary the length of the control impulses substantially in a direct or proportional relationship to the variation that is to be corrected.

Thus, by affording corrective periods of adjustment that vary in a direct relationship with respect to the magnitude of the detected variation, alternating with idle inervals or periods that vary in an inverse relationship with respect to the magnitude of such detected variation, the regulator disclosed in Fig. 1 of the drawings operates to effect rapid re-establishment of the desired speed when variation thereof is detected, and by reason of the aforesaid relationship of the lengths of the adjusting periods and the idle periods to the speed variation that is to be corrected, such correction is accomplished without over-correction or hunting.

The regulating action that is thus attained by the structure shown in Fig. 1 is graphically illustrated in Figs. 4 and 4A of the drawings. Thus in Fig. 4, the length of the variable release periods of the relays A and B have been plotted with respect to the magnitude of the detected variation of the condition that is being measured and regulated, the line 126A showing the variation of the release period of the relay A which governs the length of the idle periods, while the line 126B shows the variation in the release period of the relay B which governs the length of the adjusting period of the apparatus.

In Fig. 4A of the drawings, it has been assumed that relatively great variation of the critical condition has been detected, so that the control member 70 under such circumstances would be disposed a considerable distance from its neutral position N, the location on one side or the other of the neutral position being determined of course by the sense of the detected variation. The engagement of the brush 75 with one of the contact strips, as S, completes the energizing circuit to the relay B, and partially conditions the related direction-determining circuit, as the wire 98; and as an incident to the operation of the relay B, the relay contacts B2U and B3U of the two direction-determining circuits are further conditioned. These direction-determining circuits are of course open at this time due to the operated condition of relay A, so that the adjusting mechanism remains idle so long as the relay A remains operated. The operation of the relay B serves however to break the energizing circuit of the relay A, at contact B1L, and hence the relay A remains operated only for the release period that is determined by the location of the brush 75A along the resistance RA.

Thus where the sense of the detected variation is such as to cause the brush 75 to engage the contact segment S, and the magnitude of the variation is such that the control member 70 is displaced a substantial distance from its neutral position N, a relatively small portion of the resistance RA will be connected across the relay A so as to produce a relatively short release period for the relay A which governs the interval between the adjusting periods, and a relatively large portion of the resistance RB will be connected across the relay B so as to produce a relatively long release period for the relay B which controls the length of the adjusting periods.

Hence, with particular reference to the graphic representation afforded by Figs. 4 and 4A, it will be observed that after the relay B has been energized as hereinabove described, the mechanism will have an idle period 125—1 that is terminated at the end of the release period of the relay A, and when the relay A is thus released, an adjusting period 126—1 is initiated. In Fig. 4A it will be observed that during this adjusting period 126—1, the magnitude of the detected variation will be substantially reduced, and at the end of this adjusting period, the release of the relay B will again close the energizing circuit for the relay A. The relay A will therefore be energized so as to thereby close the energizing circuit for the relay B which will again break the energizing circuit for the relay A and will break the control circuit that is effective in the assumed situation through the contact A—1. The adjusting circuit will therefore remain open until such time as the release period of the relay A has expired, such release period thus affording an idle period 125—2 as represented in Fig. 4A of the drawings. This idle period 125—2 will of course be substantially longer than the idle period 125—1, this being caused by the reduction in the detected variation during the preceding adjusting period 126—1. In this connection it might be observed that such reduction of the detected variation has increased the amount of the resistance RA that is in circuit across the coil of the relay A, thereby to increase the release time of the relay A. At the end of the idle period 125—2, a second and somewhat shorter adjusting period 126—2 will be initiated so as to again reduce the amount of the detected variation, and at the end of the adjusting period 126—2, a third idle period 125—3 will be initiated.

The mechanism will progress through a series of alternate idle periods 125 and adjusting periods 126 in the manner just described until such time as the detected variation has been so reduced as to bring the brush 75 into the space between the adjacent ends of the contact strips S and F, and it will be observed that the adjusting periods 126 will become progressively shorter, and the idle periods 125 will become progressively longer, as the detected variation is reduced. Thus the mechanism shown in Fig. 1 attains a proportionalized regulating action, and while the condition that is being regulated will be brought quite rapidly toward the desired value, the long idle periods 125 that are provided when the detected variation is relatively small serve to afford time for the critical condition to stabilize at a particular value and in addition, the short adjusting periods 126 that are afforded at this time serve to guard against overadjustment and hunting. This will be particularly clear when the extreme shortness of the final adjusting periods, as 126—10 and 126—11, are noted in Fig. 4A.

In the embodiment of the invention disclosed in Fig. 1 of the drawings, the apparatus has been illustrated as particularly adapted for the regulation of the speed of a rotating member so that this speed may be maintained at a desired value, but the regulating apparatus of the present invention is of more general application than would be indicated by the embodiment illustrated in Fig. 1. Thus, as illustrated in Fig. 2 of the drawings, the invention has been illustrated in association with a heating system whereby the temperature in a heated chamber 12D may be regulated. Thus the chamber 12D is arranged to be heated by hot water that is pumped through a connection 13D to a suitable heat transfer means within the chamber 12D, such pumping action being attained by a hot water pump 15D that is driven through a connection 16D by a variable speed drive means 17D. The variable speed drive 17D is adjusted by a connection 24 from a power operated speed adjusting means 20 that is illustrated as being of the same character as that illustrated in Fig. 1, and the temperature in the chamber 12D is measured by an associated thermostat 48D that is operatively connected by a link 74D to the control member 70. The control member 70 is illustrated in Fig. 2 as comprising a part of a switch unit 46 that is the same as that illustrated in Fig. 1, and the switch unit 46 acts through relay units 47 and 25 to govern the operation of the power operated adjusting means 20 in the same manner as hereinbefore described in connection with Fig. 1. The regulating operation attained in the construction shown in Fig. 2 is substantially the same as hereinbefore described in connection with Fig. 1, and the regulating action may be graphically illustrated in the same manner, as for example, in Figs. 4 and 4A.

In Fig. 3 of the drawings, the invention has been illustrated as associated with means for regulating any measurable condition, the units 20, 25, 46 and 47 being the same as illustrated in Figs. 1 and 2. Thus the means in which the critical condition is produced are indicated at 12E, and the critical condition in this unit 12E is varied by a variable condition-producing means 15E that is operatively associated with the unit 12E by a connection 13E. Means for adjusting the condition-producing action of the condition-producing means 15E are indicated as a unit 17E that is operatively associated or connected with the unit 15E by a connection 19E, and this adjustable governing unit 17E is adjusted through a connection 24 from the adjusting unit 20 that is of the same form that is illustrated in Fig. 1.

The critical condition that is to be regulated in the unit 12E is measured by an associated condition measuring means indicated as a unit at 45E, and such condition measuring means are connected by a link 74E to the control member 70 of a switch unit 46 that corresponds with the unit 46 of Fig. 1. Thus the control member 70 is adjusted by the condition measuring means 45E, and the switch unit 46 acts upon the relay units 47 and 25 in the same manner as hereinbefore described in connection with Fig. 1. Thus the regulating mechanism of the present invention is applicable in a general sense to the regulation of any measurable condition that is capable of controlled variation. The operation of the regulating mechanism shown in Fig. 3 may be graphically illustrated in the same manner as the mechanism shown in Fig. 1, as for example in the manner shown in Figs. 4 and 4A.

The regulating mechanism that has thus been afforded by the present invention is such that it may be readily changed or adjusted so as to attain cycles of adjusting or regulating operation that are different than the cycle of operation shown in Figs. 4 and 4A. For example, the mechanism may readily be changed so as to afford idle periods that are of constant length while providing adjusting periods that are varied in substantially direct proportion to the magnitude of detected variation. Thus, in Fig. 5, the relationship of the release period of the relay A to the magnitude of the detected variation is indicated by the vertical line 120A—1, while the similar relationship for the release period of the relay B is indicated at 120B—1. When this relationship is desired, the rheostat RA may be disconnected, as for example, at the terminal 79, and in such an instance the value of the resistance 87 may be adjusted to give the desired constant release time for the relay A. When the mechanism is thus connected, all of the idle periods 125C will be constant, while the adjusting periods 126V will become progressively smaller or shorter as the magnitude of the detected variation becomes smaller. Hence the possibility of overcorrection is minimized in substantially the same manner as when both of the rheostats RA and RB are utilized, and this will be apparent from a consideration of Fig. 5A and a comparison of this graphical illustration with the illustration afforded in Fig. 4A of the drawings.

In other instances, the particular character of the mechanism with which the regulator is to be associated may make it desirable that constant adjusting periods 126 be afforded while variable or proportional idle periods are employed, and the operation of the mechanism of the present invention under such circumstances is graphically illustrated in Figs. 6 and 6A of the drawings. Thus in Fig. 6, the lines 120A—2 and 120B—2 illustrate the relation of the release periods in the relays A and B to the magnitude of the detected variation under the circumstances just outlined, and this relationship of the release times of the relays A and B may be attained through disconnection of the rheostat RB, as for example, at the terminal 81. When this is done, the adjustment of the resistance 88 will govern the standard or constant length of the release time of the relay B. Under such circumstances, the length of the adjusting periods 126C will be constant as illustrated in Fig. 6A; while the idle periods 125V will become progressively longer as the magnitude of the detected variation becomes smaller. The increase in the length of the idle periods 125V as the magnitude of the detected variation becomes smaller will of course enable the regulated condition to have a considerable period in which to become stabilized at a particular value, and while some overcorrection may be encountered, as is indicated at 126 in Fig. 6A, this standard of operation may in such an instance be satisfactory, but if not, resort may again be had to the variable or proportional action that is attained in the manner hereinbefore described with respect to Figs. 4A and 5A.

Under other circumstances, the character of the installation may dictate that constant adjusting periods and constant idle periods may be desirable, as graphically illustrated in Fig. 7A of the drawings, and under such circumstances, both of the rheostats RA and RB are rendered ineffective as by disconnection thereof at the respective terminals 79 and 81. When this is done, the line 120AB—3 may represent the constant release times of the relays A and B, as shown in Fig. 7, and while both of these periods have been represented as being the same, it will be evident that the release time of either of the relays A or B may be adjusted by means of the resistances 87 or 88 so as to be different than the release time of the other of the two relays. When the release times of the two relays are adjusted as indicated at Fig. 7, the idle periods 125C—1 and the adjusting periods 126C—1 are constant, and the operation of the regulator mechanism under such circumstances is represented in Fig. 7A. It will be recognized of course that under some circumstances this arrangement may be to overcorrect, although this has not been indicated in Fig. 7A. The standard of regulation that is to be attained may be such that overcorrection of this character may be tolerated, but with the present apparatus, resort may of course be had at any time to the proportionalized action that has been hereinbefore described.

From the foregoing description it will be apparent that the present invention enables the construction and maintenance of highly sensitive and accurate regulators to be simplified, and enables regulators to be utilized in many different fields, enables the application of a basic form and construction of a regulator to different fields and conditions of use, and enables these results to be attained in a practical and economical manner.

It will also be evident that the present invention enables the readjusting or correcting operations to progress quite rapidly and to be relatively long when the critical condition has varied a considerable amount from the desired value, but it will also be evident that when the amount of variance of the critical condition from the desired value is relatively small, the increments of correction or readjustments are relatively small so as to avoid over-adjustment or hunting. The present invention therefore enables the correction or readjustment of a critical condition to be accomplished without hunting, and enables this to be accomplished by apparatus that is simple and inexpensive in character. Furthermore, this invention enables the attainment of a proportionalized governing or regulating operation to be materially simplified and enables such proportionalized governing action to be attained by means that is primarily electrical in character.

More specifically, the present invention enables a proportionalized governing or regulating operation to be attained through use of a plurality of slow-to-release relays, and it enables the release times of such relays to govern not only the length of the speed adjusting operations that are effected but also to enable such relays to govern the intervals between the successive speed adjusting operations of the apparatus.

Thus, while we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. In a regulator apparatus, a shiftable control member adapted to be shifted into and out of a neutral position in response to variations in a condition that is to be regulated, a control circuit, switch means for said control circuit operated by said control member to close said control circuit when such control member moves out of said neutral position in one direction and to open said control circuit when said control member is in said neutral position, a first slow-to-release relay having normally closed relay contacts included in said control circuit and effective when said first relay is operated to break said control circuit, a second slow-to-release relay having normally open contacts included in said control circuit and effective when said second relay is released to break said control circuit, and circuit means governed by said control member so as to be closed by said control member when said control member is displaced from said neutral position for causing repeated cycles of alternate energization of said first and second relays whenever and so long as said control member is displaced from said neutral position.

2. In a regulator apparatus, a shiftable control member adapted to be shifted into and out of a neutral position in response to variations in a condition that is to be regulated, switch means operated by said control member to close said switch means when said control member moves out of said neutral position and to open said switch means when said control member is in said neutral position, a control circuit including said switch means, a first slow-to-release relay having normally closed contacts included in said control circuit and effective when said first relay is operated to break said control circuit, a second slow-to-release relay having normally open contacts included in said control circuit and effective when said second relay is released to break said control circuit, circuit means including and controlled by said switch means for causing alternate energization of said relays when said switch means are closed, and rheostat means adjustable by said control member and connected across said second relay so as to be operable to place a resistance across said second relay when said control member moves out of said neutral position and to increase said resistance as the displacement of said control member from said neutral position increases.

3. In a regulator apparatus, a shiftable control member shiftable into or out of a neutral position in response to variations in a condition that is to be regulated, a control circuit, switch means for said control circuit operated by said control member to close said control circuit when such control member moves out of said neutral position and to open said control circuit when said control member is in said neutral position, a first slow-to-release relay having normally closed contacts included in said control circuit and effective when said first relay is operated to break said control circuit, a second slow-to-release relay having normally open contacts included in said control circuit and effective when said second relay is released to break said control circuit, circuit means including said switch means for causing repeated alternate energization of said relays when said control member is displaced from said neutral position, and means operated by said control member to oppositely vary the length of the release periods of said two relays as the displacement of said control member from said neutral position increases.

4. In a regulator apparatus, a shiftable control member shiftable into or out of a neutral position in response to variation in a condition that is to be regulated, a control circuit, switch means for said control circuit operated by said control member to close said control circuit when such control member moves out of said neutral position and to open said control circuit when said control member is in said neutral position, a first slow-to-release relay having normally closed contacts included in said control circuit and effective when said first relay is operated to break said control circuit, a second slow-to-release relay having normally open contacts included in said control circuit and operable when said second relay is released to break said control circuit, circuit means rendered effective by said control member for causing repeated cycles of alternate energization of said relays when said control member is displaced from said neutral position, and means operated by said control member to vary the length of the release period of at least one of said relays as the displacement of said control member from said neutral position is increased.

5. In a regulator apparatus, a control circuit having a first set of normally closed contacts and a second set of normally open contacts all included in series therein, a first means including a relay coil operatively associated with said first set of said contacts for opening said first set of contacts when said relay coil is energized, a second means including a second relay coil operatively associated with said second set of contacts to close said second set of contacts when said second relay is energized, a control member adapted to be shifted into or out of a neutral position in response to variations in a condition that is to be regulated, circuit means controlled in part by said control member for causing said relay coils to be energized alternately in repeated cycles when said control member is displaced from said neutral position, and means associated with the respective relay coils for imparting slow-to-release characteristics thereto.

6. In a regulator apparatus, a control circuit having a set of normally closed contacts and a set of normally open contacts included in series therein, a first means including a relay coil operatively associated with said set of normally closed contacts for opening said set of normally closed contacts when said relay coil is energized, a second means including a second relay coil operatively associated with said set of normally open contacts to close said set of normally open contacts when said second relay coil is energized, a control member adapted to be shifted into or out of a neutral position in response to variations in a condition that is to be regulated, means controlled in part by said control member for causing said relay coils to be energized alternately when said control member is displaced from said neutral position, means associated with the respective relay coils for imparting slow-to-release characteristics thereto, and means operated by said control member for varying the release period of at least one of said relay coils as the displacement of said control member from said neutral position is varied.

7. In a regulator apparatus, a shiftable control member adapted to be shifted in one direction or the other from a neutral position in response to variations in a condition that is to be regulated, a pair of selective control circuits, switch means under control of said control member and operative to close one or the other of said control circuits selectively when said control member moves out of said neutral position in one direction or the other and to open said control circuits when said control member is in said neutral position, a first slow-to-release relay having normally closed contacts included in both of said selective control circuits and effective when said first relay is operated to break said control circuits, a second slow-to-release relay having normally open contacts included in said selective control circuits and effective when said second relay is released to break said control circuits, and circuit means arranged to be opened and closed by said control member for causing alternate energization of said relays when said control member is displaced from said neutral position.

8. In a regulator apparatus, a shiftable control member adapted to be shifted in one direction or the other from a neutral position in response to variations in a condition that is to be regulated, a pair of selective control circuits, switch means for said control circuits and operated by said control member to close one or the other of said control circuits selectively when such control member moves out of said neutral position in one direction or the other and to open said control circuits when said control member is in said neutral position, a first slow-to-release relay having normally closed relay contacts included in both of said selective control circuits and effective when said first relay is operated to break said control circuits, a second slow-to-release relay having normally open contacts included in said selective control circuits and effective when said second relay is released to break said control circuits, circuit means governed by said control member for causing alternate energization of said relays when said control member is displaced from said neutral position, and means operated by said control member to oppositely vary the length of the release periods of said two relays as the displacement of said control member from said neutral position increases.

9. In a regulator apparatus, a shiftable control member adapted to be shifted in one direction or the other from a neutral position in response to variations in a condition that is to be regulated, a pair of selective control circuits, switch means operated by said control member to effect selective closure of said control circuits when such control member moves out of said neutral position in one direction or the other and to open said control circuits when said control member is in said neutral position, a first slow-to-release relay having normally closed relay contacts included in both of said selective control circuits and effective when said first relay is operated to break said control circuits, a second slow-to-release relay having normally open contacts included in said selective control circuits and effective when said second relay is released to break said control circuits, and circuit means including contacts of both of said relays and said switch means for causing alternate energization of said relays in repeated cycles when said control member is displaced from said neutral position thereof.

10. In a regulator apparatus, a shiftable control member having a neutral position and adapted to be shifted in one direction or the other in response to variation in a condition that is to be regulated, a pair of selective control circuits, switch means for said control circuits and operated having a movable contact and a pair of stationary contacts adapted for selective closure by said control member to close one or the other of said control circuits selectively when such control member moves out of said neutral position in one direction or the other, and to open said control circuits when said control member is in said neutral position, a first slow-to-release relay having normally closed relay contacts included in both of said selective control circuits and effective when said first relay is operated to break said control circuits, a second slow-to-release relay having normally open contacts included in said selective control circuits and effective when said second relay is released to break said control circuits, means governed by control member for causing alternate energization of said relays when said control member is displaced from said neutral position, and means operated by said control member to vary the length of the release period of at least one of said relays as the displacement of said control member from said neutral position is increased.

11. In a regulator apparatus, a control circuit having a first set of contacts, a second set of normally closed contacts and a third set of normally open contacts all included in series therein, a control member adapted to be shifted into or out of a neutral position in response to variations in a condition that is to be regulated and operable close said first set of contacts when said control member moves out of said neutral position and to open said first set of contacts when said control member is in said neutral position, a first means including a relay coil operatively associated with said second set of said contacts for opening said second set of contacts when said relay coil is energized, a second means including a second relay coil operatively associated with said third set of contacts to close said third set of contacts when said second relay coil is energized, means controlled in part by said first set of contacts and in part by said control member for causing said relay coils to be energized alternately and in repeated cycles when said control member is displaced from said neutral position, and means associated with the respective relay coils for imparting slow-to-release characteristics thereto.

12. In a regulator apparatus, a shiftable control member having a neutral position and adapted to be shifted in one direction or the other in response to variations in a condition that is to be regulated, switch means having a movable contact and a pair of stationary contacts adapted for selective closure by said control member when such control member moves out of said neutral position in one direction or the other, and to be opened when said control member is in said neutral position, first and second slow-to-release relays, a pair of selective control circuits extended from said stationary contacts of said switch means and each controlled by normally closed contacts of said first relay and normally open contacts of said second relay, means affording an energizing circuit for said first relay including normally closed contacts of said second relay, and an energizing circuit for said second relay extended from said stationary contacts of said switch means and including normally open contacts of said first relay.

13. In a regulator apparatus, a shiftable control member having a neutral position and adapted to be shifted in one direction or the other in response to variations in a condition that is to be regulated, switch means operatively associated with said control member and having a movable contact and a pair of stationary contacts adapted for selective closure by said control member when such control member moves out of said neutral position in one direction or the other, and to be opened when said control member is in said neutral position, first and second slow-to-release relays, a pair of selective circuits extended from said stationary contacts of said switch means and each controlled by normally closed contacts of said first relay and normally open contacts of said second relay, means affording an energizing circuit for said first relay including normally closed contacts of said second relay, an energizing circuit for said second relay extended from said stationary contacts of said switch means and including normally open contacts of said first relay, and rheostat means operated by said control member and operatively associated with at least one of said relays to vary the release time of at least one of said relays as the extent of displacement of said control member from said neutral position is varied.

14. In a regulator apparatus, a shiftable control member having a neutral position and adapted to be shifted in one direction or the other in response to variations in a condition that is to be regulated, switch means operated by said control member and having a movable contact and a pair of stationary contacts adapted for selective closure by said control member when such control member moves out of said neutral position in one direction or the other, and to be opened when said control member is in said neutral position, first and second slow-to-release relays, a pair of selective circuits extended from said stationary contacts of said switch means and each controlled by normally closed contacts of said first relay and normally open contacts of said second relay, means affording an energizing circuit for said first relay including normally closed contacts of said second relay, an energizing circuit for said second relay extended from said stationary contacts of said switch means and including normally open contacts of said first relay, rheostat means operated by said control member and operatively associated with said second relay to increase the release time of said second relay as the extent of displacement of said control member from said neutral position is increased, and rheostat means operated by said control member and operatively associated with said first relay to reduce the release time of said first relay as the extent of displacement of said control member from said neutral position is increased.

15. In a regulator apparatus, a shiftable control member having a neutral position and adapted to be shifted in one direction or the other in response to variations in a condition that is to be regulated, switch means operated by said control member and having a movable contact and a pair of stationary contacts adapted for selective closure by said control member when such control member moves out of said neutral position in one direction or the other, and to be opened when said control member is in said neutral position, first and second slow-to-release relays, a pair of selective circuits extended from said stationary contacts of said switch means and each controlled by normally closed contacts of said first relay and normally open contacts of said second relay, means affording an energizing circuit for said first relay including normally closed contacts of said second relay, an energizing circuit for said second relay extended from said stationary contacts of said switch means and including normally open contacts of said first relay, rheostat means operated by said control member and operatively associated with said first relay to increase the release time of said second relay and reduce the release time of said first relay as the extent of displacement of said control member from said neutral position is increased.

16. In a regulator apparatus, a shiftable control member having a neutral position and adapted to be shifted in one direction or the other in response to variations in a condition that is to be regulated, switch means operated by said control member and having a movable contact and a pair of stationary contacts adapted for selective closure by said control member when such control member moves out of said neutral position in one direction or the other, and to be opened when said control member is in said neutral position, first and second slow-to-release relays, a pair of selective circuits extended from said stationary contacts of said switch means and each controlled by normally closed contacts of said first relay and normally open contacts of said second relay, means affording an energizing circuit for said first relay including normally closed contacts of said second relay, and an energizing circuit for said second relay extended from said stationary contacts of said switch means and including normally open contacts of said first relay, and rheostat means operated by said control member and operatively associated with said second relay to increase the release time of said second relay as the extent of displacement of said control member from said neutral position is increased.

17. In a regulator apparatus, a control circuit having a first set of normally closed contacts and a second set of normally open contacts all included in series therein, a first means including a relay coil operatively associated with said first set of said contacts for opening said first set of contacts when said relay coil is energized, a second means including a second relay coil operatively associated with said second set of contacts to open said second set of contacts when said second relay coil is energized, a control member adapted to be shifted into or out of a neutral position in response to variations in a condition that is to be regulated, means controlled in part by said control member for causing said relay coils to be energized alternately in repeated cycles when said control member is displaced from said neutral position, means associated with the respective relay coils for imparting slow-to-release characteristics thereto, and means operated by said control member and operatively associated with at least one of said relay coils for varying the release period of at least one of said relay coils as the displacement of said control member from said neutral position is varied.

18. In a regulator apparatus, a control circuit having a first set of normally closed contacts and a second set of normally open contacts all included in series therein, a first means including a relay coil operatively associated with said first set of said contacts for opening said first set of contacts when said relay coil is energized, a second means including a second relay coil operatively associated with said second set of contacts to close said second set of contacts when said second relay coil is energized, a control member adapted to be shifted into or out of a neutral position in response to variations in a condition that is to be regulated, interconnected energizing circuits for said relays operable when rendered effective to cause said relay coils to be energized alternately in repeated cycles, means governed by said control member for rendering said energizing circuits effective when said control member is displaced from said neutral position, and adjustable means associated with the respective relay coils for imparting adjustably variable slow-to-release characteristics to such relay coils.

19. In a regulator apparatus, a shiftable control member adapted to be shifted into and out of a neutral position in response to variations in a condition that is to be regulated, switch means operated by said control member to close said switch means when said control member moves out of said neutral position and to open said switch means when said control member is in said neutral position, a control circuit including said switch means, a first slow-to-release relay having normally closed contacts included in said control circuit and effective when said first relay is operated to break said control circuit, a second slow-to-release relay having normally open contacts included in said control circuit and effective when said second relay is released to break said control circuit, and circuit means governed by said control member for causing alternate energization of said relays.

20. In an apparatus of the character described, a shiftable control member having a neutral position and adapted to be shifted in one direction in response to variation in a condition that is to be regulated, switch means having a movable contact and a stationary contact adapted for closure by said control member when such control member moves out of said neutral position in said direction, and to be opened when said control member is in said neutral position, first and second slow-to-release relays, control circuit extended from said stationary contact of said switch means and controlled open contacts of said second relay, means affording an energizing circuit for said first relay including normally closed contacts of said second relay, and an energizing circuit for said second relay extended from said stationary contact of said switch means and including normally open contacts of said first relay.

21. In a regulator apparatus, a shiftable control member having a neutral position and adapted to be shifted in one direction or the other in response to variations in a condition that is to be regulated, switch means having a movable contact and a pair of stationary contacts adapted for selective closure by said control member when such control member moves out of said neutral position in one direction or the other, and to be opened when said control member is in said neutral position, first and second slow-to-release relays, a pair of selective control circuits extended from said stationary contacts of said switch means and each controlled by normally closed contacts of said first relay and normally open contacts of said second relay, means affording an energizing circuit for said first relay including normally closed contacts of said second relay, an energizing circuit for said second relay extended from said stationary contacts of said switch means and including normally open contacts of said first relay, and rheostat means connected across the terminals of one of said relays and operatively associated with said control member to place varying amounts of resistance in circuit across said last mentioned one of said relays as the extent of displacement of said control member from said neutral position is varied.

ROSSER L. WILSON.
ERWIN R. KNAUER.

REFERENCES CITED

The following references are of record in the file of this patent:

UNITED STATES PATENTS

| Number | Name | Date |
| --- | --- | --- |
| 1,598,694 | Shackleton | Sept. 7, 1926 |
| 1,863,302 | Geiselman | June 14, 1932 |
| 1,913,699 | Crago | June 13, 1933 |
| 2,339,750 | Bartholy | Jan. 25, 1944 |